US012180024B2

(12) United States Patent
Yoshida

(10) Patent No.: US 12,180,024 B2
(45) Date of Patent: Dec. 31, 2024

(54) IMAGE FORMING APPARATUS AND SHEET FEEDING APPARATUS

(71) Applicant: CANON KABUSHIKI KAISHA, Tokyo (JP)

(72) Inventor: Masatoshi Yoshida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 653 days.

(21) Appl. No.: 17/381,433

(22) Filed: Jul. 21, 2021

(65) Prior Publication Data

US 2022/0033206 A1 Feb. 3, 2022

(30) Foreign Application Priority Data

Aug. 3, 2020 (JP) ................................ 2020-131919

(51) Int. Cl.

*B65H 3/52* (2006.01)
*G03G 15/00* (2006.01)
*G03G 15/08* (2006.01)

(52) U.S. Cl.

CPC ......... *B65H 3/5261* (2013.01); *B65H 3/5246* (2013.01); *G03G 15/0891* (2013.01); *G03G 15/6552* (2013.01); *B65H 2402/60* (2013.01); *B65H 2404/16* (2013.01); *G03G 2215/00679* (2013.01); *G03G 2215/0836* (2013.01)

(58) Field of Classification Search

CPC .. B65H 3/5261; B65H 3/6246; B65H 3/5207; B65H 2402/60; B65H 2404/16

See application file for complete search history.

(56) References Cited

U.S. PATENT DOCUMENTS

| | | | | |
|---|---|---|---|---|
| 7,913,996 B2 * | 3/2011 | Nishikata | ............ | B65H 3/0638 271/145 |
| 8,079,586 B2 * | 12/2011 | Watanabe | ............ | B65H 3/0638 271/145 |
| 8,757,613 B2 | 6/2014 | Yamomoto | | |
| 8,894,061 B2 * | 11/2014 | Matsuoka | ............... | B65H 5/06 271/10.13 |

(Continued)

FOREIGN PATENT DOCUMENTS

| | | |
|---|---|---|
| JP | 2000327147 A | 11/2000 |
| JP | 2011132035 A | 7/2011 |

(Continued)

*Primary Examiner* — Patrick Cicchino

(74) *Attorney, Agent, or Firm* — ROSSI, KIMMS & McDOWELL LLP

(57) ABSTRACT

An image forming apparatus includes an apparatus body including an image forming unit, a unit detachably attached to the apparatus body, a first rotary member provided in the unit, a second rotary member provided in the apparatus body and configured to be coupled with and decoupled from the first rotary member by being moved in a rotation axial direction of the first rotary member, and a restriction member provided in the apparatus body and movable to a first position and a second position. The restriction member includes an engaging portion configured to engage with the second rotary member and is configured to move the second rotary member by the engaging portion so that the second rotary member is decoupled from the first rotary member along with a move of the restriction member from the first position to the second position.

17 Claims, 11 Drawing Sheets

(56) References Cited

U.S. PATENT DOCUMENTS

| | | | | |
|---|---|---|---|---|
| 9,550,641 | B2* | 1/2017 | Inoue | B65H 7/20 |
| 9,695,000 | B2 | 7/2017 | Mizuguchi | |
| 9,880,505 | B2* | 1/2018 | Matsumoto | B65H 29/22 |
| 10,435,258 | B2 | 10/2019 | Aono | |
| 10,486,922 | B2* | 11/2019 | Horita | B65H 3/0684 |
| 10,543,995 | B2 | 1/2020 | Suzuki | |
| 10,584,006 | B2* | 3/2020 | Suzuki | B65H 5/062 |
| 10,656,587 | B2* | 5/2020 | Koga | B65H 3/0669 |
| 2009/0295069 | A1* | 12/2009 | Shiina | G03G 15/6511<br>271/264 |
| 2023/0023244 | A1* | 1/2023 | Yoshida | B65H 3/0684 |

FOREIGN PATENT DOCUMENTS

| | | | |
|---|---|---|---|
| JP | 2015229538 | A | 12/2015 |
| JP | 2016204150 | A | 12/2016 |
| JP | 2017030914 | A | 2/2017 |
| JP | 2018070347 | A | 5/2018 |
| JP | 2018090360 | A | 6/2018 |
| JP | 2019059559 | A | 4/2019 |

* cited by examiner

IMAGE FORMING APPARATUS AND SHEET FEEDING APPARATUS

BACKGROUND OF THE INVENTION

Field of the Invention

The present invention relates to an image forming apparatus configured to form an image on a sheet and to a sheet feeding apparatus configured to feed the sheet.

Description of the Related Art

An image forming apparatus such as a copier and a printer is provided with a sheet feeding apparatus configured to feed a sheet, i.e., a recording medium. The sheet feeding apparatus includes a separation mechanism configured to separate the sheet one by one to prevent a plurality of sheets from being conveyed while overlapped with each other, i.e., to prevent so-called double feeding. The separation mechanism of this sort includes a pad-shaped or a roller-shaped separation member that comes into contact with a sheet feed roller for feeding sheets to form a nip portion and to separate the sheet by applying a frictional force to the sheet at the nip portion.

Normally, a user or a service person is recommended to periodically replace the separation member because separating performance drops if a surface of the separation member is worn by repeatedly feeding sheets. As for a sheet feeding apparatus in which a holder member for holding a separation roller can be attached and detached, Japanese Patent Application Laid-open No. 2016-204150 discloses a configuration of positioning and restricting the holder member from falling by attaching/detaching a stopper member by a vertical slide operation. Japanese Patent Application Laid-open No. 2011-132035 discloses a configuration of utilizing a sheet feed roller as a stopper of a separation pad and of facilitating detachment of the separation pad as the separation pad projects out of a guide surface of a conveyance guide by detaching the sheet feed roller.

Not only the separation mechanism for separating sheets, an image forming apparatus often includes an attachable/detachable unit to replace a component member and to make maintenance. If a procedure for attaching/detaching the unit is lessened, the work for attaching/detaching the unit to be made by the user or the service man becomes easier. In such a case, it is possible to obtain such advantages that a work time is reduced and a downtime of the apparatus is shortened.

SUMMARY OF THE INVENTION

The present disclosure provides an image forming apparatus and a sheet feeding apparatus that make attachment/detachment works of a unit easier.

According to one aspect of the invention, an image forming apparatus includes an apparatus body including an image forming unit configured to form an image on a sheet, a unit detachably attached to the apparatus body, a first rotary member provided in the unit, a second rotary member provided in the apparatus body and configured to be coupled with and decoupled from the first rotary member by being moved in a rotation axial direction of the first rotary member, and a restriction member provided in the apparatus body and movable to a first position and a second position, the first position being a position where the restriction member restricts the unit attached to the apparatus body from being detached in a detaching direction intersecting with the rotation axial direction, the second position being a position where the restriction member does not restrict the unit attached to the apparatus body from being detached in the detaching direction, wherein the restriction member includes an engaging portion configured to engage with the second rotary member and is configured to move the second rotary member by the engaging portion so that the second rotary member is decoupled from the first rotary member along with a move of the restriction member from the first position to the second position.

According to another aspect of the invention, a sheet feeding apparatus includes a sheet feed roller configured to feed a sheet, an apparatus body configured to support the sheet feed roller, a unit detachably attached to the apparatus body, a separation roller provided in the unit, arranged to be in contact with the sheet feed roller to form a nip portion between the sheet feed roller and the separation roller, and configured to separate the sheet in contact with sheet feed roller from sheets other than the sheet in contact with the sheet feed roller by exerting a frictional force on the sheets at the nip portion, a roller shaft provided in the apparatus body and configured to be coupled with and decoupled from the separation roller by being moved in a rotation axial direction of the separation roller, and a restriction member provided in the apparatus body and movable to a first position and a second position, the first position being a position where the restriction member restricts the unit attached to the apparatus body from being detached in a detaching direction intersecting with the rotation axial direction, the second position being a position where the restriction member does not restrict the unit attached to the apparatus body from being detached in the detaching direction, wherein the restriction member includes an engaging portion configured to engage with the roller shaft and is configured to move the roller shaft by the engaging portion so that the roller shaft is decoupled from the separation roller along with a move of the restriction member from the first position to the second position.

Further features of the present invention will become apparent from the following description of exemplary embodiments with reference to the attached drawings.

DESCRIPTION OF THE EMBODIMENTS

Embodiments of the present disclosure will be described below with reference to the drawings.

Figure 1:
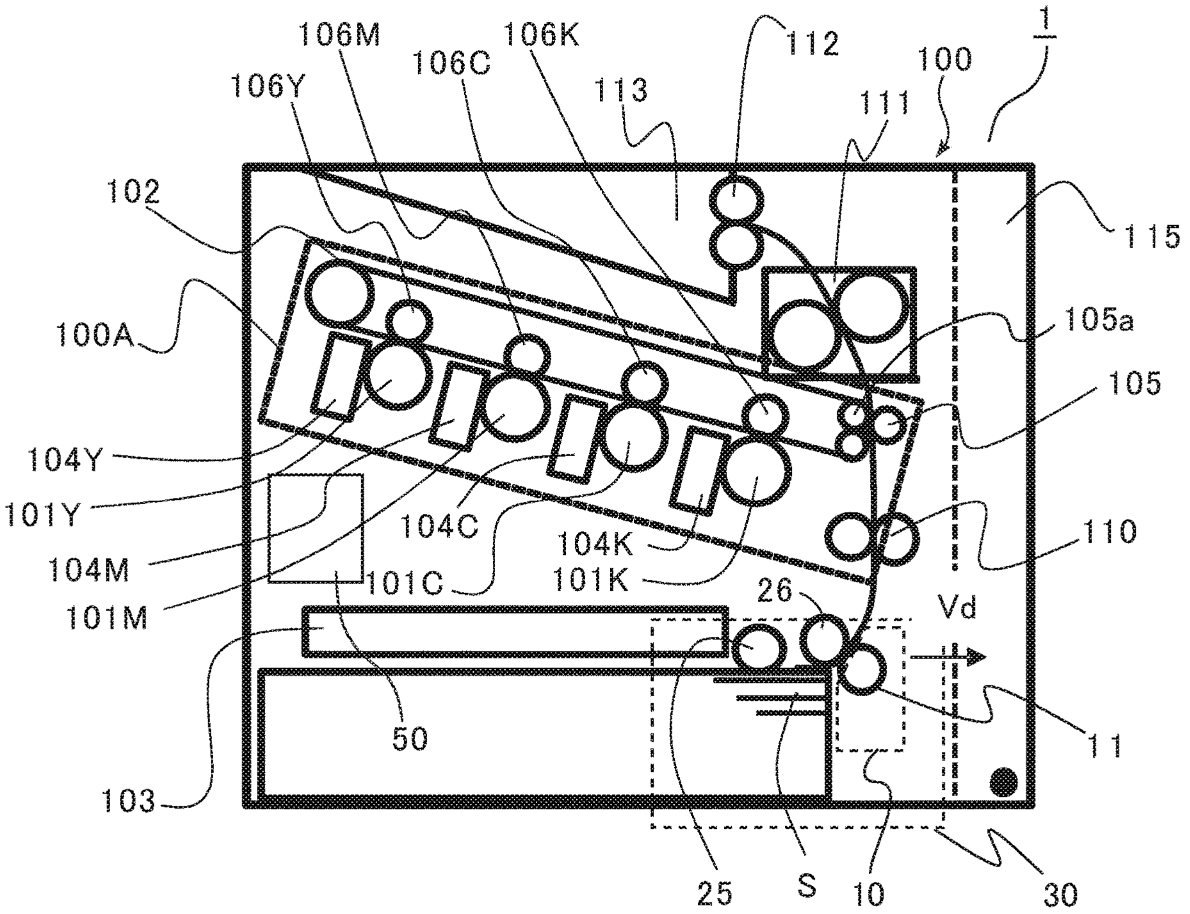
FIG. 1 is a schematic diagram illustrating a configuration of an image forming apparatus of the present disclosure.

FIG. 1 is a schematic diagram of a color laser printer (referred to as a printer 1 hereinafter) serving as an image forming apparatus of the present disclosure. The printer 1 includes an image forming unit 100A and a sheet feeding apparatus 30. The image forming unit 100A includes four photosensitive drums 101Y, 101M, 101C and 101K for respectively bearing four color toner images of yellow, magenta, cyan and black. The image forming unit 100A also includes an endless intermediate transfer belt 102 in contact with those four photosensitive drums and primary transfer rollers 106Y, 106M, 106C and 106K disposed on an inner peripheral side of the intermediate transfer belt 102. The image forming unit 100A also includes a secondary transfer roller 105 configured to secondarily transfer the images that have been transferred onto the intermediate transfer belt 102 onto a sheet S and a counter roller 105*a* facing the secondary transfer roller 105 across the intermediate transfer belt 102.

The photosensitive drums 101Y, 101M, 101C and 101K function as image bearing members configured to bear electrostatic latent images and toner images in an electrophotographic process. A transfer mechanism composed of the intermediate transfer belt 102, the primary transfer rollers 106Y, 106M, 106C and 106K and the secondary transfer roller 105 functions as a transfer unit configured to transfer the toner images that have been formed onto the image bearing members onto the sheet S. It is noted that as the sheet serving as a recording medium, various sheet members having different sizes and materials can be used. For instance, the sheet may be a sheet of paper such as plain paper and thick paper, plastic film, cloth, sheet material on which a surface treatment has been applied such as coated paper, and a special shaped sheet such as an envelope and an index sheet.

As the image forming unit 100A starts an image forming operation, the photosensitive drums 101Y, 101M, 101C and 101K rotate and charger units homogeneously charge surfaces of the photosensitive drums 101Y, 101M, 101C and 101K. Then, a laser scanner 103 irradiates the surfaces of the photosensitive drums 101Y, 101M, 101C and 101K with beams corresponding to image signals. As a result, electrostatic latent images are formed on the surfaces of the photosensitive drums 101Y, 101M, 101C and 101K, respectively. These electrostatic latent images correspond to component image information that an image information to be printed is decomposed into four monochrome images of yellow, magenta, cyan and black.

Next, the electrostatic latent images are developed by using toner serving as developer stored in developing cartridges 104Y, 104M, 104C and 104K, as toner images, i.e., visible images, formed on the photosensitive drums 101Y, 101M, 101C and 101K. The toner images formed on the surfaces of the photosensitive drums 101Y, 101M, 101C and 101K are primarily transferred onto the intermediate transfer belt 102 by the primary transfer rollers 106Y, 106M, 106C and 106K. At this time, the toner images of the respective colors are superimposed with each other so as to form a full-color toner image on the intermediate transfer belt 102. Then, as the intermediate transfer belt 102 rotates, the toner image formed on the intermediate transfer belt 102 is conveyed to a secondary transfer portion, which is a nip portion formed between the secondary transfer roller 105 and a counter roller 105*a*.

In parallel with such toner image forming operation, the sheet S is fed one by one from the sheet feeding apparatus 30. The sheet feeding apparatus 30 includes a cassette 35 serving as a sheet stacking portion in which the sheets S are stored in a stacked state and a pickup roller 25 configured to deliver an uppermost sheet S in the cassette 35. The sheet feeding apparatus 30 also includes a sheet feed roller 26 configured to receive and convey the sheet S received from the pickup roller 25 and a separation roller 11 forming a nip portion, i.e., a separation nip, by being in contact with the sheet feed roller 26. The separation roller 11 functions as a separation member for separating a sheet in contact with the sheet feed roller 26 from other sheets by applying a frictional force to the sheets at the separation nip.

A skew of the sheet S fed from the sheet feeding apparatus 30 is corrected by a registration roller pair 110, and the sheet S is then conveyed to the secondary transfer portion. A conveyance speed of the registration roller pair 110 is controlled to adjust a position of the sheet S with the toner image borne on the intermediate transfer belt 102. The toner image borne on the intermediate transfer belt 102 is secondarily transferred onto the sheet S arrived at the secondary transfer portion by applying a transfer voltage to the secondary transfer roller 105.

The sheet S onto which the toner image has been transferred is then conveyed to a fixing unit 111 of a thermal fixing type. The fixing unit 111 fixes the toner image to the sheet S by heating and pressing the toner image on the sheet S while nipping and conveying the sheet S. The sheet S which has passed through the fixing unit 111 is discharged by a sheet discharge roller 112 to a sheet discharge portion 113 at an upper part of the apparatus.

By the way, a waste tonner collecting device 50 is disposed at a position below the image forming unit 100A. In a process of the image forming operation described above, residual toner of the toner image primarily transferred onto the intermediate transfer belt 102 is removed (scraped) by a cleaning blade to clean the intermediate transfer belt 102. This arrangement makes it possible to suppress the sheet S from being soiled by the residual toner adhering to the sheet S after adhering to the secondary transfer roller 105.

The residual toner scraped out of the intermediate transfer belt 102 is conveyed to a collecting unit 51 by a conveyance screw to be collected as waste toner within the collecting unit 51. The collecting unit 51 is configured as a unit that can be attached to and detached from the apparatus body 100 such that an operator can remove and discard the waste toner when the collecting unit 51 is filled up by the waste toner. The printer 1 includes a cover that can be opened and closed with respect to the apparatus body 100, and the collecting unit 51 is exposed by opening the cover. Note that the "apparatus body" described here refers to a part except of parts detachable from the printer 1, i.e., a part including a frame body and components fixed to the frame body. Still further, the "operator" described here is a user or a service person of the printer 1 for example.

The printer 1 also includes a door 115 that can be opened and closed with respect to the apparatus body 100, and the separation unit 10 including the separation roller 11 is exposed by opening the door 115. The separation unit 10 that can be detached from the apparatus body 100 in a Vd-direction in FIG. 1 and attached to the apparatus body 100 in an opposite direction the Vd-direction is another unit that can be attached and detached with respect to the apparatus body 100 by the operator.

First Embodiment

A configuration for attaching and detaching the collecting unit 51 to and from the waste toner collecting device 50 will be described in detail as a first embodiment with reference to FIG. 2 and FIGS. 3A through 3F. Note that partial members such as a side surface of the collecting unit 51 are not illustrated in FIG. 2 and FIGS. 3A through 3F to illustrate a mechanism within the device.

Figure 2:
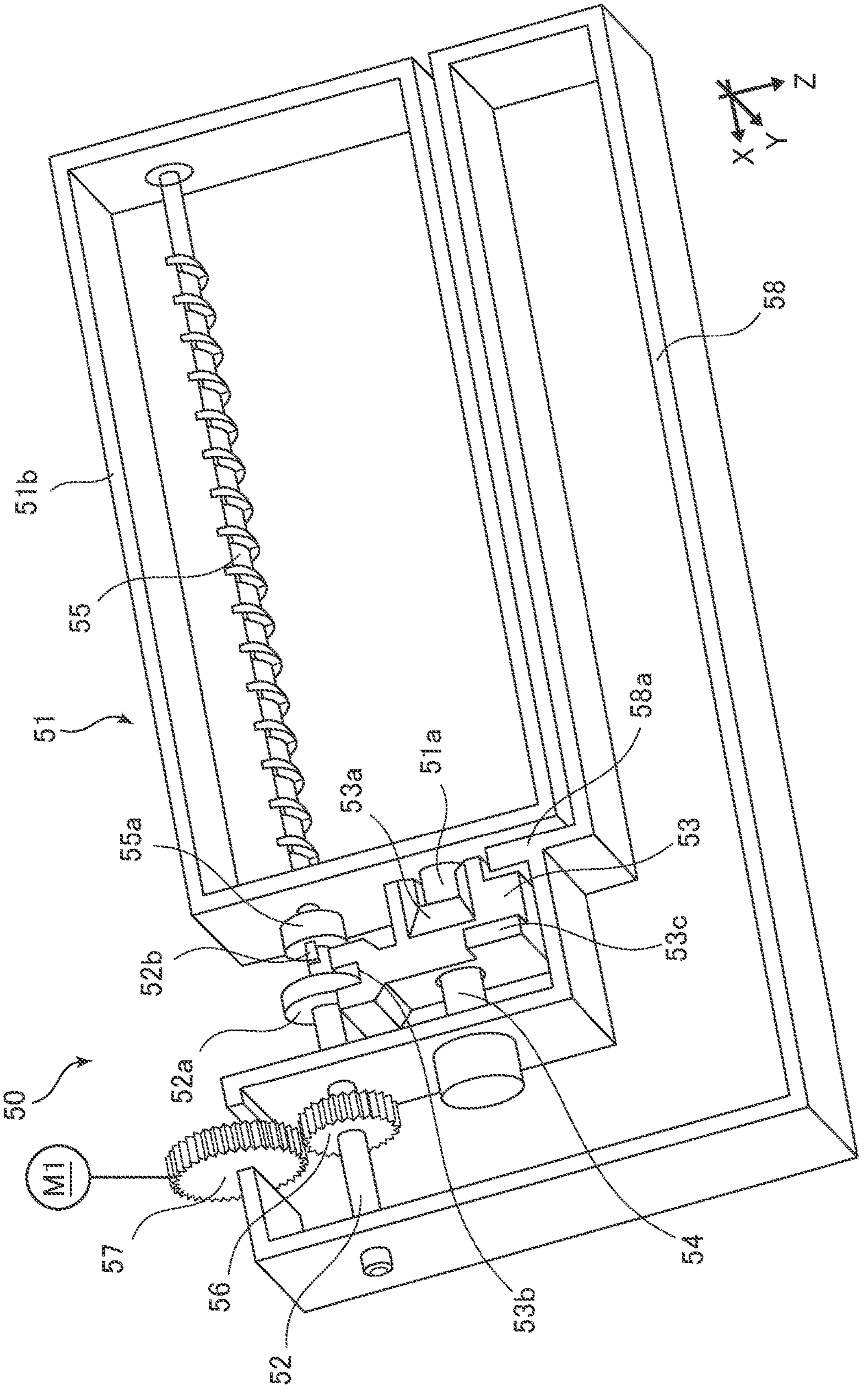
FIG. 2 is a schematic diagram of a waste toner collecting device according to a first embodiment.

FIG. 2 is a schematic diagram of the waste toner collecting device 50. The waste toner collecting device 50 includes a first gear 57, a second gear 56, a drive transmission shaft 52, a slide member 53 and an urging member 54 each provided in the apparatus body 100, and further includes a collecting unit 51 to be attached to and detached from the apparatus body 100. The collecting unit 51 includes a container 51*b* configured to contain or store waste toner, a screw 55 disposed within the container 51*b* and a drive input portion 55*a* provided on a screw shaft of the screw 55. The drive input portion 55*a* is a first rotary member of the present embodiment and the drive transmission shaft 52 is a second rotary member of the present embodiment. The slide member 53 is a restriction member, i.e., a lock member, of the present embodiment capable of restricting, i.e., locking, the collecting unit 51 from being detached.

A rotation axial direction of the drive transmission shaft 52 will be referred to as an "X-direction" hereinafter. A direction intersecting with the X-direction, in which the collecting unit 51 is attached to the apparatus body 100, will be referred to as a "Y-direction" hereinafter. Preferably, the Y-direction is a direction vertical to the X-direction. A direction vertical to the X- and Y-directions will be also referred to as a "Z-direction" hereinafter.

The first and second gears 57 and 56 are rotatably supported by a body frame 58, which is a part of the apparatus body 100, and are engaged with each other. The first gear 57 is rotated by a driving force transmitted from a motor M1, which is a driving source provided in the apparatus body. The second gear 56 is attached to the drive transmission shaft 52 and rotates in a body with the drive transmission shaft 52.

A key 52*b* is formed on the drive transmission shaft 52. When the key 52*b* fits with a keyway 55*b* provided on the drive input portion 55*a* of the collecting unit 51, the drive transmission shaft 52 and the drive input portion 55*a* are coupled not to rotate relatively and the driving force supplied from the driving source is transmitted to the screw 55. The screw 55 conveys the waste toner within the container 51*b* collected from the intermediate transfer belt 102 and other to the container 51*b* to uniformize the waste toner and to improve a filling efficiency thereof within the container 51*b*.

The drive transmission shaft 52 is configured to be slidable in the X-direction with respect to the body frame 58 such that the key 52*b* fits/disengages to/from the keyway 55*b*. A position of the drive transmission shaft 52 that enables the key 52*b* to fit with the keyway 55*b* will be referred to as a "coupling position" and a position of the drive transmission shaft 52 that disengages the key 52*b* from the keyway 55*b* will be referred to as a "decoupling position" hereinafter.

The drive transmission shaft 52 is also provided with an annular rib 52*a* serving as an engaged portion of the present embodiment. The annular rib 52*a* is a protrusion radially projecting from the drive transmission shaft 52 and is formed as a radially extending disk in the present embodiment. The slide member 53 is provided with an engaging portion 53*b* that engages with the annular rib 52*a*. The engaging portion 53*b* includes a U-shaped groove configured to sandwich the annular rib 52*a* from both sides in the X-direction. Accordingly, the drive transmission shaft 52 is restricted from moving in the X-direction with respect to the slide member 53 in a state in which the engaging portion 53*b* engages with the annular rib 52*a*.

The slide member 53 is movable with respect to the body frame 58 between a restrict position serving as a first position or a lock position for restricting the collecting unit 51 attached to the apparatus body 100 from being detached and a release position serving as a second position or a retracting position for allowing (i.e., not to restrict) the collecting unit 51 to be detached. When the slide member 53 is located at the restrict position as the engaging portion 53*b* engages with the annular rib 52*a*, the drive transmission shaft 52 is held at the coupling position. When the slide member 53 is located at the release position, the drive transmission shaft 52 is held at the decoupling position.

The slide member 53 is provided with a tapered surface 53*a* for moving the slide member 53 in attaching the collecting unit 51. The tapered surface 53*a* is a pressed portion to be pressed by a boss 51*a* serving as a press portion provided on the container 51*b* of the collecting unit 51. The slide member 53 is also provided with a handling portion 53*c* for enabling the operator to manually operate the detaching operation of the collecting unit 51. The handling portion 53*c* is provided at a position exposed when the cover described above of the apparatus body 100 is opened. The move of the slide member 53 caused by the operation for attaching the collecting unit 51 or by the operation of the operator will be described later.

An urging member 54 serving as an urging portion of the present embodiment urges the slide member 53 toward the first position, i.e., in a direction opposite from the X-direction. An elastic member such as a torsion coil spring or rubber may be used as the urging member 54 provided between the body frame 58 and the slide member 53. The body frame 58 is provided with an abutment rib 58*a* facing the slide member 53 from an opposite side of the X-direction. The abutment rib 58*a* is disposed such that the slide member 53 is positioned as the slide member 53 abuts with the abutment rib 58*a* by an urging force of the urging member 54.

Attaching Collecting Unit

Figure 3A:
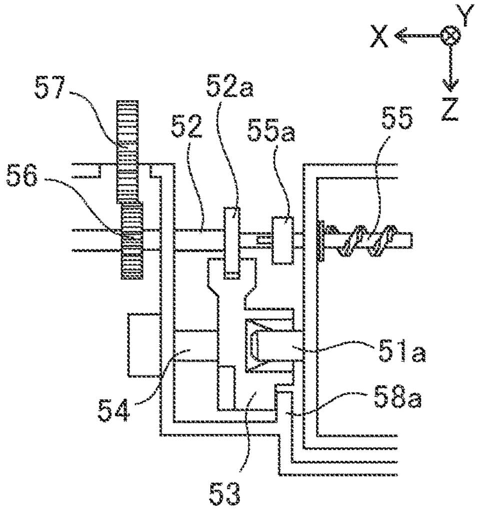
FIG. 3A is a schematic diagram illustrating a part of the waste toner collecting device according the first embodiment.
Figure 3B:
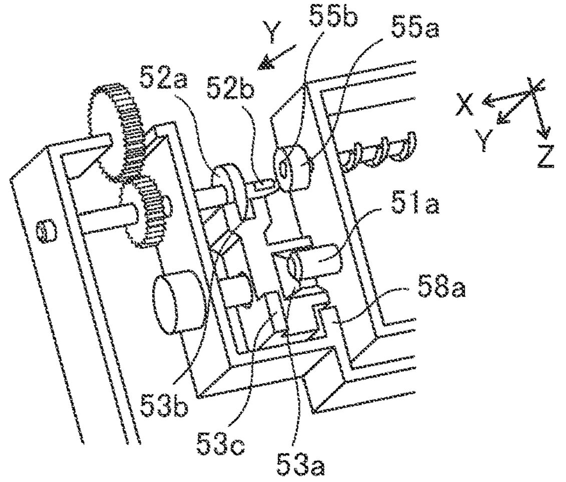
FIG. 3B is a perspective view illustrating the part of the waste toner collecting device according the first embodiment.
Figure 3C:
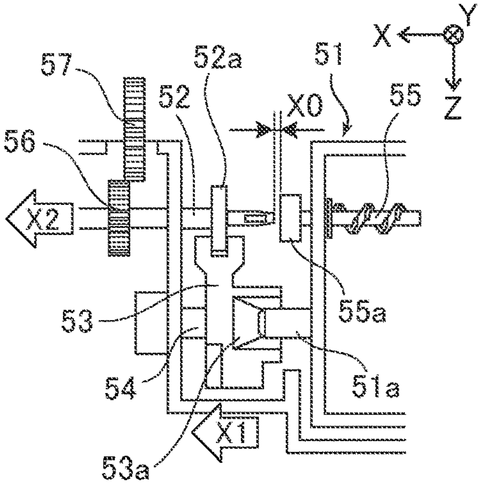
FIG. 3C is a schematic diagram illustrating the part of the waste toner collecting device according the first embodiment.
Figure 3D:
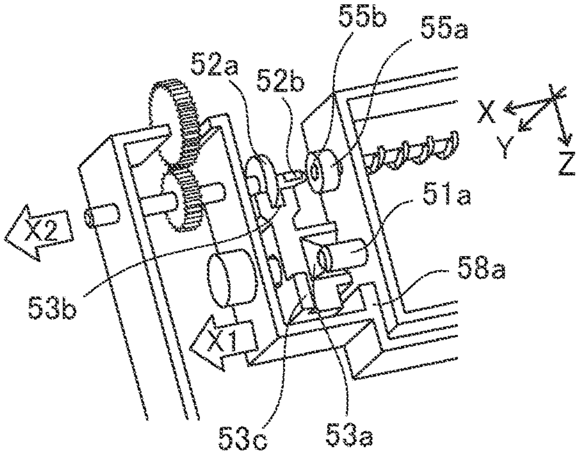
FIG. 3D is a perspective view illustrating the part of the waste toner collecting device according the first embodiment.
Figure 3E:
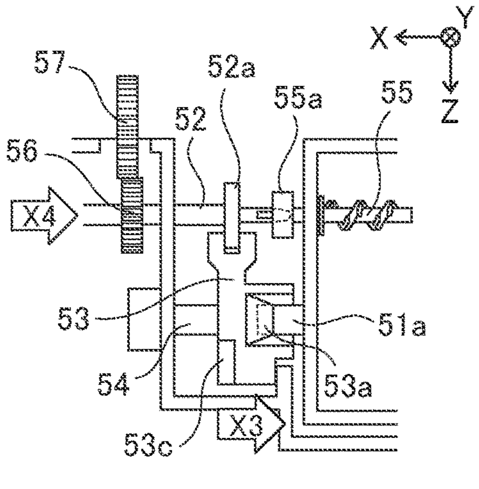
FIG. 3E is a schematic diagram illustrating the part of the waste toner collecting device according the first embodiment.
Figure 3F:
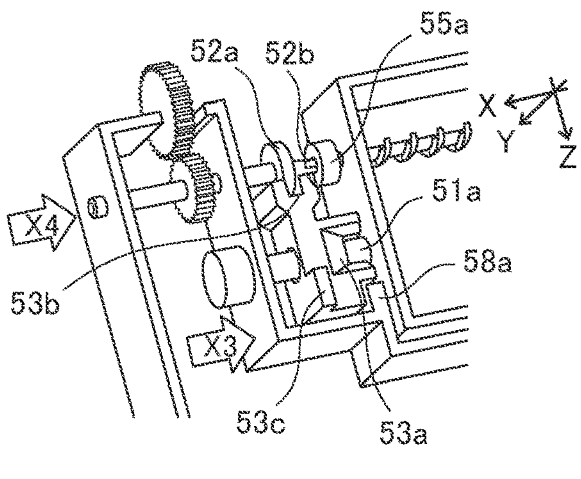
FIG. 3F is a perspective view illustrating the part of the waste toner collecting device according the first embodiment.

An operation in attaching the collecting unit 51 to the apparatus body 100 will be described with reference to FIGS. 3A through 3F. FIGS. 3A and 3B illustrate a state before the collecting unit 51 is attached to the apparatus body 100, FIGS. 3C and 3D illustrate a state in which the collecting unit 51 is on a way of being attached to the apparatus body 100 and FIGS. 3E and 3F illustrate a state in which the attachment of the collecting unit 51 is completed. Note that FIGS. 3A, 3C and 3E are schematic diagrams illustrating a part of the waste toner collecting device 50 viewed in the Y-direction and FIGS. 3B, 3D and 3F are perspective views illustrating the part of the waste toner collecting device 50.

As illustrated in FIGS. 3A and 3B, in a state before the collecting unit 51 is attached to the apparatus body 100, the slide member 53 is located at the restrict position, i.e., at the first position, by being urged by the urging member 54 and abutted against the abutment rib 58*a*. The drive transmission shaft 52 is held at the coupling position by the slide member 53.

In a case where the operator performs the operation for attaching the collecting unit 51, the operator holds the collecting unit 51 at a position and an orientation as illustrated in FIGS. 3A and 3B and inserts the collecting unit 51 in the Y-direction. At this time, a tip of the drive transmission shaft 52 and the drive input portion 55*a* of the collecting unit 51 are located in a positional relationship in which they overlap with each other when seen in the Y-direction. The boss 51*a* provided on the collecting unit 51 is located at a position overlapping with the tapered surface 53*a* of the slide member 53 when seen in the Y-direction.

Along with the insertion of the collecting unit 51, the boss 51*a* of the collecting unit 51 abuts with the tapered surface 53*a* of the slide member 53 as illustrated in FIGS. 3C and 3D. The tapered surface 53*a* is an inclined portion inclined in the Y-direction so as to extend in the X-direction toward upstream in the Y-direction. Therefore, along with the operation for attaching the collecting unit 51, the slide member 53 slides in the X-direction in spite of the urging force of the urging member 54 by the tapered surface 53*a* being pressed by the boss 51*a* serving as the press portion. Thereby, the slide member 53 moves from the restrict position, i.e., the first position, to the release position, i.e., the second position, as indicated by an arrow X1. That is, the tapered surface 53*a* has a function of exerting a component of force in the X-direction on the slide member 53 at a contact portion of the collecting unit 51 and the slide member 53 along with the move of the collecting unit 51 in the Y-direction. The drive transmission shaft 52 engaged with the slide member 53 moves from the coupling position in FIGS. 3A and 3B to the decoupling position in FIGS. 3C and 3D as indicated by an arrow X2 as the slide member 53 moves from the restrict position to the release position.

It is noted that shapes of the tapered surface 53*a* and the boss 51*a* are set such that a clearance X0 in the X-direction is assured between the tip of the drive transmission shaft 52 and the drive input portion 55*a* in a state in which the slide member 53 is moved furthest as the tapered surface 53*a* is pressed as illustrated in FIG. 3C. The clearance X0 is set such that the tip of the drive transmission shaft 52 located at the decoupling position does not contact with the drive input portion 55*a* by considering manufacturing tolerance and others of related members. Therefore, the abovementioned overlap state of the tip of the drive transmission shaft 52 with the drive input portion 55*a* of the collecting unit 51 is eliminated in a state in which the drive transmission shaft 52 is located at the decoupling position. The overlap state of the tapered surface 53*a* and the boss 51*a* is also eliminated in a state in FIG. 3C. Therefore, the operator can insert the collecting unit 51 into a predetermined attaching position without causing any interference between the drive input portion 55*a* of the collecting unit 51 and the drive transmission shaft 52. The predetermined attaching position is a position where a rotation axial direction of the drive input portion 55*a* is approximately coincident with the rotation axial direction of the drive transmission shaft 52.

Still further, while the press portion of the collecting unit 51 is composed of the cylindrical boss 51*a* and the pressed portion of the slide member 53 is composed of the tapered surface 53*a* inclined with respect to the attaching direction, the press portion may be formed into a shape inclined with respect to the attaching direction. That is, at least one of the press portion of the collecting unit 51 and the pressed portion of the slide member 53 may be configured to be inclined with respect to the attaching direction such that a force in the X-direction acts on the slide member 53 along with the move of the collecting unit 51 in the attaching direction.

When the insertion of the collecting unit 51 into the attaching position is completed, the force in the X-direction that has been generated at the contact portion of the tapered surface 53*a* and the boss 51*a* no longer act on the slide member 53 as the boss 51*a* passes through an end portion of the tapered surface 53*a* as illustrated in FIGS. 3E and 3F. Therefore, the slide member 53 moves from the release position, i.e., the second position, to the restrict position, i.e., the first position, in a direction opposite to the X-direction by the urging force of the urging member 54 as indicated by an arrow X3. The slide member 53 stops at the restrict position by abutting against the abutment rib 58*a*.

It is noted that a space for storing the boss 51*a* indicated by a dot line in FIG. 3E is provided on a back side of the tapered surface 53*a* of the slide member 53. Then, a move of the collecting unit 51 in a direction of detaching the collecting unit 51, i.e., a direction opposite to the Y-direction, is restricted as the slide member 53 presses the boss 51*a* stored in that space after the collecting unit 51 is attached to the attaching position. That is, the slide member 53 also functions as a member that restricts the move of the collecting unit 51 and positions the collecting unit 51 in terms of the Y-direction.

Along with the move of the slide member 53, the drive transmission shaft 52 also moves from the decoupling position to the coupling position as indicated by an arrow X4 in the direction opposite to the X-direction. Thereby, the key 52*b* of the drive input portion 55*a* fits into the keyway 55*b* of the drive input portion 55*a* and the drive transmission shaft 52 is coupled with the drive input portion 55*a*, so that the driving force can be transmitted to the screw 55.

Detaching Collecting Unit

Meanwhile, the operator operates the handling portion 53*c* provided on the slide member 53 in detaching the collecting unit 51 out of the apparatus body 100. Specifically, the operator pinches the handling portion 53*c* by fingers in the state in FIGS. 3E and 3F to slide the slide member 53 in the X-direction against the urging force of the urging member 54. As the slide member 53 moves from the restrict position to the release position, the tip of the drive transmission shaft 52 is decoupled from the drive input portion 55*a* by making the clearance X0, and a tip of the tapered surface 53*a* retracts to a position where the tip of the boss 51*a* can pass through (see FIGS. 3C and 3D).

In other words, the coupling of the drive transmission shaft 52 with the drive input portion 55*a* is released and the overlap state of the slide member 53 with the boss 51*a* of the collecting unit 51 in the attached state is eliminated. In this state, a move of the collecting unit 51 in the detaching direction, i.e., in the direction opposite to the Y-direction, is not hampered. Accordingly, the operator can detach the collecting unit 51 out of the apparatus body 100 by pulling the collecting unit 51 in the direction opposite to the Y-direction by another hand while handling the handling portion 53*c* by one hand for example. After discharging the waste toner by opening a cover or a plug of the container 51*b* of the collecting unit 51, or after preparing a new collecting unit 51, the operator attaches the collecting unit 51 again to the apparatus body 100 to finish the operation.

Thus, the coupling of the drive transmission shaft 52 with the drive input portion 55*a* and the overlap state of the slide member 53 with the part, i.e., the boss 51*a*, of the collecting unit 51 are kept unless the handling portion 53*c* is operated in the direction against the urging force of the urging member 54 as described above. Therefore, the collecting unit 51 is restricted from being detached in the state in which the drive transmission shaft 52 provided in the apparatus body 100 is coupled with the drive input portion 55*a* provided on the collecting unit 51. That is, according to the present embodiment, it is possible to prevent the drive transmission shaft 52 or the drive input portion 55*a* from being damaged otherwise caused by forcible detachment of the collecting unit 51, without complicating the work for attaching and detaching the collecting unit 51.

As described above, according to the present embodiment, the drive transmission shaft 52 moves in linkage with the slide member 53 that restricts the attaching and detaching operation of the collecting unit 51 in the configuration in which the drive transmission shaft 52 is coupled with and decoupled from the drive input portion 55*a* of the collecting unit 51 by the move in the rotation axial direction of the drive transmission shaft 52. This arrangement makes it possible to easily attach and detach the collecting unit 51 as compared to a configuration in which the slide member 53 and the drive transmission shaft 52 need to be moved independently because the drive transmission shaft 52 is decoupled from the drive input portion 55*a* along with the operation of moving the slide member 53 from the restrict position to the release position.

In attaching the collecting unit 51, the boss 51*a*, i.e., the press portion, provided on the collecting unit 51 presses the slide member 53 by resisting against the urging force of the urging member 54 to move from the restrict position to the release position. Therefore, the work for attaching the collecting unit 51 is completed just by one operation of moving the collecting unit 51 in the Y-direction which is the attaching direction.

In detaching the collecting unit 51, the operator can easily detach the collecting unit 51 because the drive transmission shaft 52 is decoupled from the drive input portion 55*a* just by the operation of pinching the handling portion 53*c* to move the slide member 53.

Second Embodiment

Figure 4:
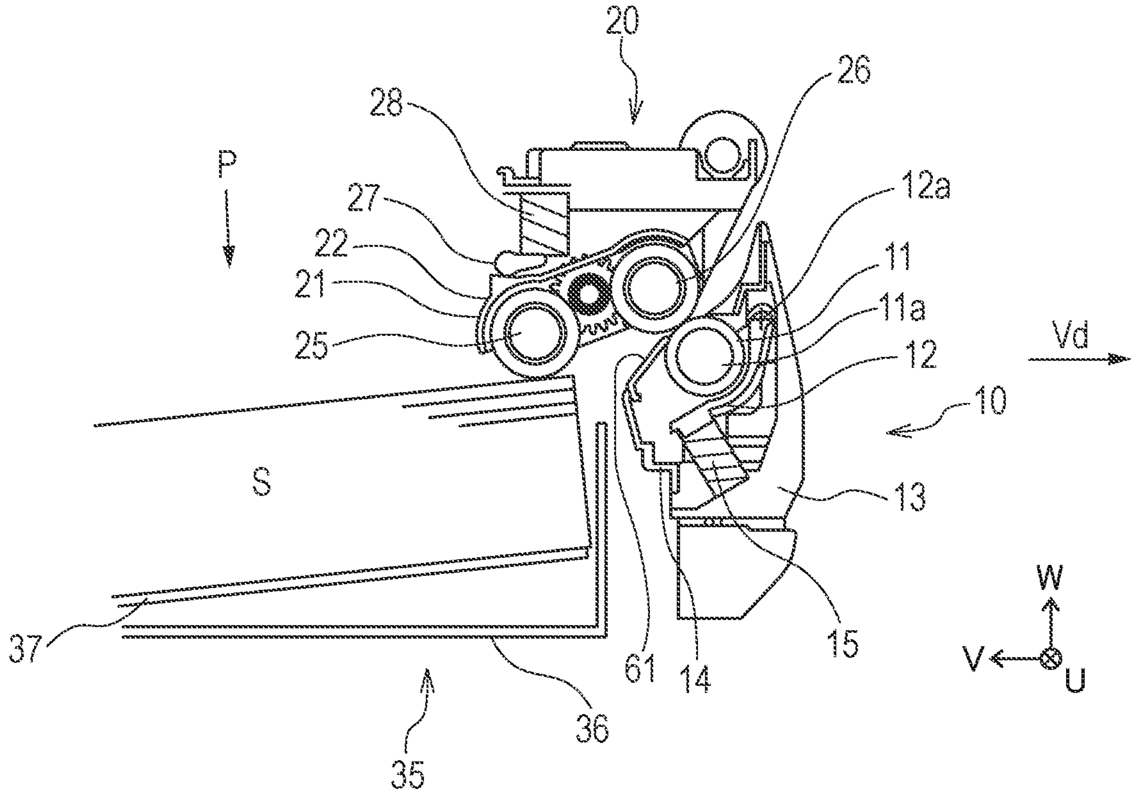
FIG. 4 is a schematic diagram of a sheet feeding apparatus according to a second embodiment.

A configuration for attaching and detaching the separation unit 10 in the sheet feeding apparatus 30 in FIG. 1 will be described as a second embodiment. FIG. 4 is a schematic diagram, seen in a rotation axial direction of the separation roller 11, illustrating the sheet feeding apparatus 30. The sheet feeding apparatus 30 includes a sheet feed unit 20 serving as a sheet feed portion, a separation unit 10 serving as a separating portion, a cassette 35 serving as a storage portion and a driving unit not illustrated.

The cassette 35 is detachably attached to an apparatus body of the sheet feeding apparatus 30 which is a part of the apparatus body 100 of the printer 1 in the present embodiment. The cassette 35 includes a cassette body 36 serving as a sheet accommodating portion and a stacking plate 37 serving as a stacking portion on which sheets S are stacked. The stacking plate 37 is liftable with respect to a bottom surface of the cassette body 36.

The sheet feed unit 20 is provided in the apparatus body 100 in the present embodiment and includes a roller unit 21 attachable to and detachable from a frame body of the sheet feed unit 20, and further includes a pressure spring 28 and a pressure arm 27. The roller unit 21 includes a roller holder 22 supported by the apparatus body 100, a pickup roller 25 and a sheet feed roller 26 each held rotatably by the roller holder 22. The roller unit 21 is pivotably supported by the sheet feed unit 20 centering on a rotation shaft of the sheet feed roller 26 in a state in which the roller unit 21 is attached to the sheet feed unit 20. The roller unit 21 is also configured such that the pickup roller 25 comes into pressure contact with an upper surface of an uppermost sheet S on the stacking plate 37 by receiving an urging force of the pressure spring 28 in a direction of an arrow P through the pressure arm 27.

The separation unit 10 is provided at a position facing the sheet feed unit 20. The separation unit 10 can be detachably attached to the apparatus body 100 of the sheet feeding apparatus 30. A configuration related to attaching and detaching of the separation unit 10 and an attaching and detaching operation thereof will be described later. The separation unit 10 includes a separation roller 11 serving as a separation rotary member, a roller holder 12 serving as a first holding member and a base member 13 serving as a second holding member. The separation unit 10 also includes a spring member 15 serving as an urging member, a nip guide 61 and a cover member 14.

A small torque limiter 11*a* is installed in the separation roller 11, and the separation roller 11 is supported by a roller shaft 60 (see FIG. 9) through the torque limiter 11*a*. The roller shaft 60 is a shaft unrotatably fixed to the apparatus body 100 and will be described later. Accordingly, braking is applied to the separation roller 11 with a torque value of the torque limiter 11*a* such that the separation roller 11 does not rotate when a torque equal to or under the torque value acts and rotates when a torque greater than the torque value acts.

The roller holder 12 rotatably holds the separation roller 11 and is held by the base member 13 swingably centering on a swing center 12*a*. That is, the base member 13 serves as a holding member configured to hold the roller holder 12. The separation roller 11 is movable in directions of coming into contact with and separating from the sheet feed roller 26 as the roller holder 12 swings. The spring member 15 is fixed to the base member 13 and exerts an urging force on the roller holder 12. The separation unit 10 is attached to the sheet feeding apparatus 30 such that the separation roller 11 comes to a position facing the sheet feed roller 26, and the separation roller 11 is pressed against the sheet feed roller 26 by the urging force of the spring member 15.

A rotation axial direction of the roller shaft 60 will be referred to as a "U-direction" hereinafter. A direction intersecting with the U-direction and in attaching the separation unit 10 to the apparatus body 100 will be referred as a "V-direction". Preferably, the V-direction is a direction vertical to the U-direction. A direction also vertical to the U-direction and the V-direction will be referred to as a "W-direction".

Figure 5A:
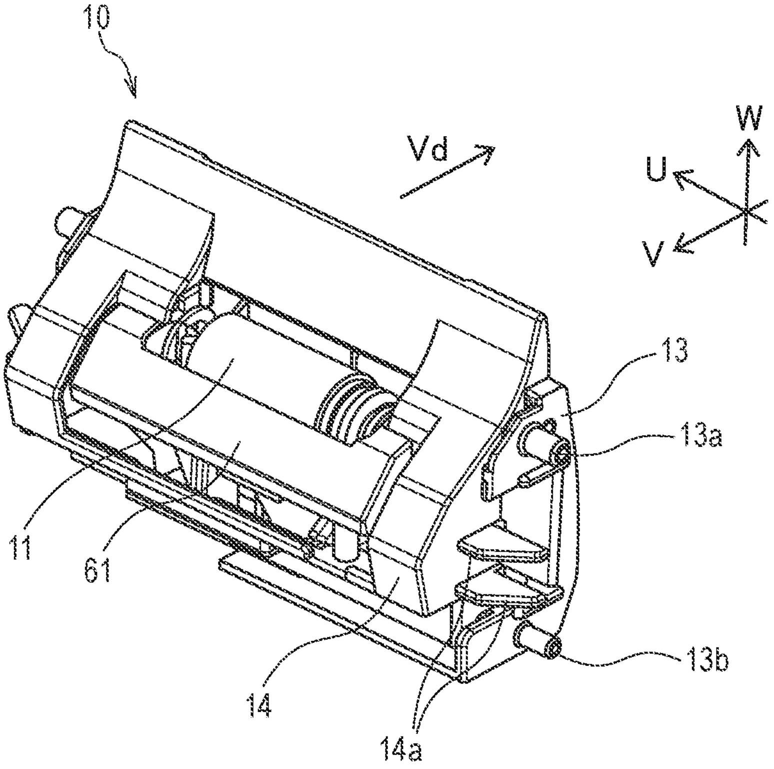
FIG. 5A is a perspective view of a separation unit of the second embodiment.
Figure 5B:
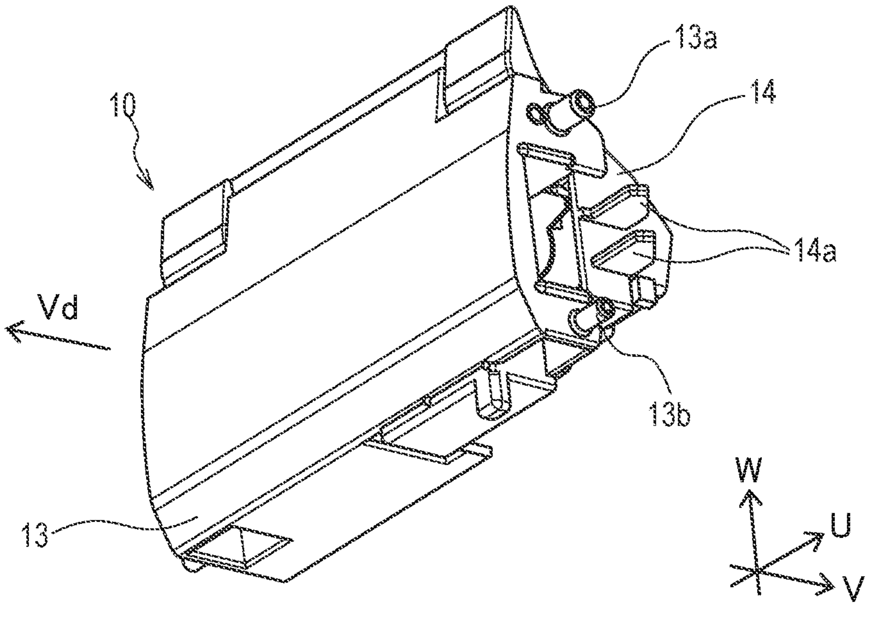
FIG. 5B is a perspective view of the separation unit of the second embodiment.

FIG. 5A is a perspective view illustrating the separation unit 10 seen from the separation roller 11 side in the V-direction, i.e., from downstream in the attaching direction. FIG. 5B is a perspective view illustrating the separation unit 10 seen from the base member 13 side in the V-direction, i.e., from upstream side in the attaching direction. The separation unit 10 is unitized in a manner of covering the internal parts by the base member 13 and the cover member 14. The operator is enabled to easily handle the separation unit 10 without touching the internal parts of the separation unit 10 by unitizing the separation unit 10 in such form.

An opening portion through which a part of an outer peripheral surface of the separation roller 11 is exposed is formed by a concave part provided in the cover member 14 and a nip guide 61 (see FIG. 5A). The nip guide 61 functions as a guide portion guiding the sheet S delivered by the pickup roller 25 out of the cassette 35 to a separation nip serving as a nip portion between the sheet feed roller 26 and the separation roller 11.

Next, a sheet feeding operation of the sheet feeding apparatus 30 will be described. When the cassette 35 is inserted into the sheet feeding apparatus 30, the stacking plate 37 is lifted up and the uppermost sheet S comes into contact with the pickup roller 25 (see FIG. 4). At this time, the pickup roller 25 comes into contact with the uppermost sheet S with a predetermined contact pressure by the urging force of the pressure spring 28 described above. Then, both of the pickup roller 25 and the sheet feed roller 26 receive a driving force from a driving unit not illustrated and rotate counterclockwise in FIG. 4.

As the pickup roller 25 starts to rotate, the sheet S starts to move toward a right side in FIG. 4 by friction between the pickup roller 25 and the sheet S and arrives at the separation nip between the sheet feed roller 26 and the separation roller 11. The separation nip has a function of separating and feeding only one sheet S downstream when two or more sheets are sent to the separation nip by the pickup roller 25.

The separation roller 11 includes the torque limiter 11*a* as described above and is applied with a torque as a resistance force in a direction inverse to a conveyance direction of the sheet S. The torque value of the torque limiter 11*a* is set such that the separation roller 11 is permitted to rotate following the sheet feed roller 26 only when one sheet S passes through the separation nip. The torque value of the torque limiter 11*a* is also set such that the separation roller 11 stops by overcoming a friction between the sheets S when two or more sheets S enter the separation nip. Accordingly, only the uppermost sheet S in contact with the sheet feed roller 26 is conveyed and the sheet other than the uppermost sheet S is blocked even if the two sheets or more enter the separation nip, the sheet S is separated one by one at the separation nip and is conveyed downstream. The sheet that has passed through the separation nip is conveyed by the pickup roller 25 and the sheet feed roller 26 to a registration roller pair 110 (see FIG. 1).

Separation Unit

Figure 6A:
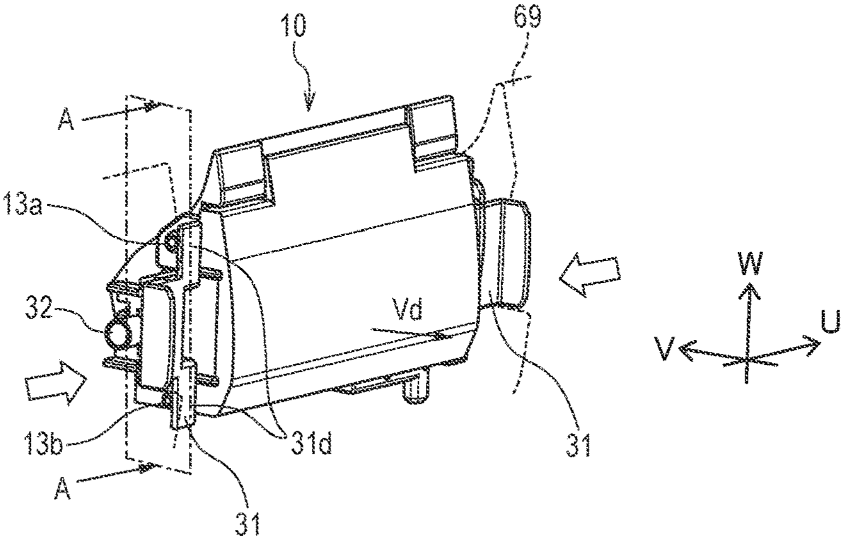
FIG. 6A illustrates a positional relationship between the separation unit and shutter members of the second embodiment.
Figure 6B:
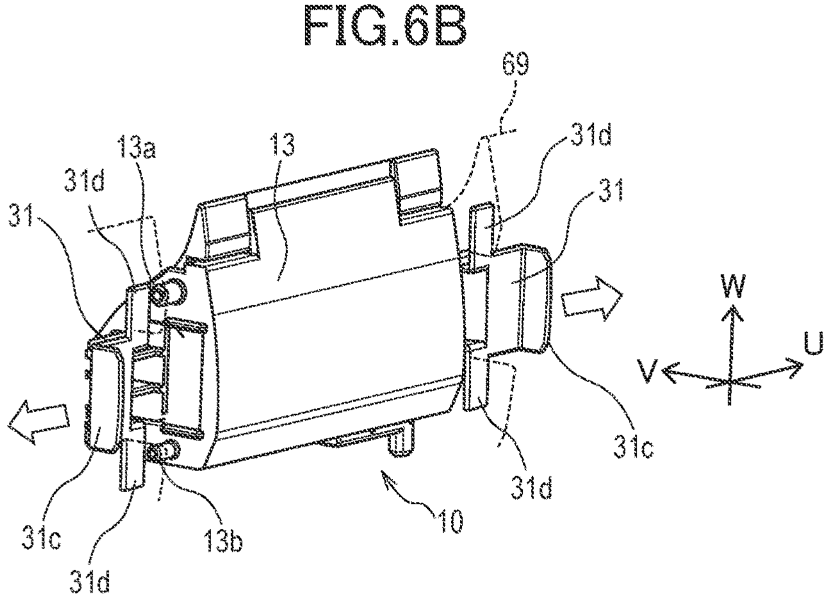
FIG. 6B illustrates a positional relationship between the separation unit and the shutter members of the second embodiment.
Figure 6C:
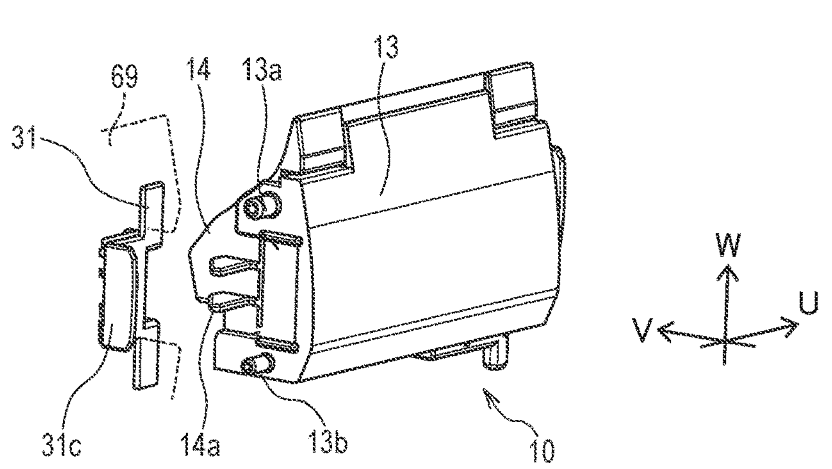
FIG. 6C illustrates a positional relationship between the separation unit and the shutter members of the second embodiment.
Figure 7:
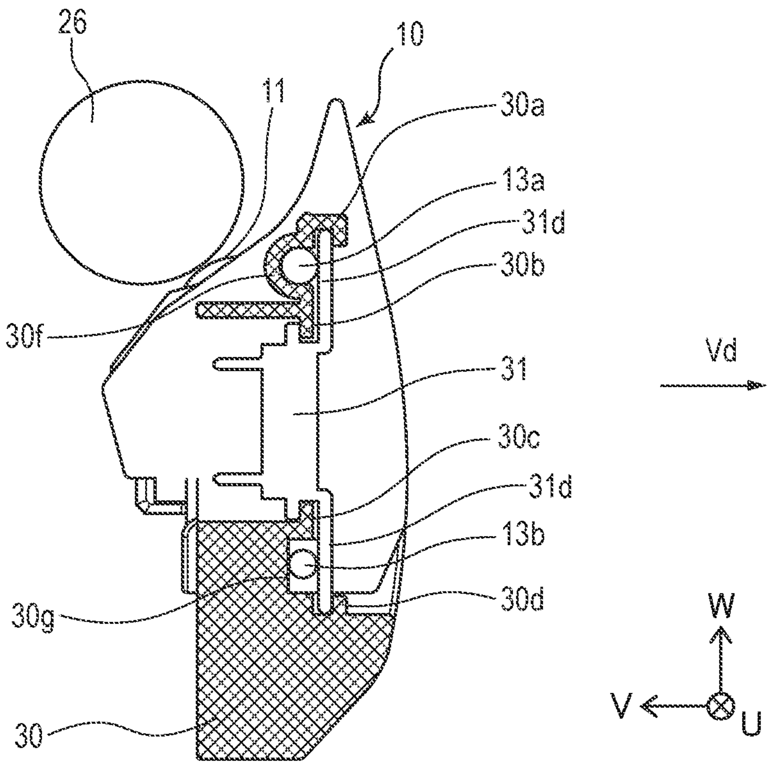
FIG. 7 is a section view illustrating the positional relationship between the separation unit and the shutter member of the second embodiment.

The configuration and a retaining method of the separation unit 10 will be described in detail with reference to FIGS. 5A and 5B through FIG. 7. FIGS. 6A through 6C are schematic diagrams illustrating moves of shutter members 31 serving as restriction members and operations for attaching and detaching the separation unit 10. FIG. 6A illustrates a state before the separation unit 10 is attached, FIG. 6B illustrates a state in which the shutter members 31 are moved to a second position, i.e., a release position or a retracting position, and FIG. 6C illustrates a state in which the separation unit 10 is detached out of the sheet feeding apparatus 30. FIG. 7 is a section view taken along a virtual plane vertical to the U-direction and is a section view taken along a plane A-A in FIG. 6A, illustrating an engagement state of the shutter members 31 with projections 13*a* and 13*b* of the separation unit 10.

The base member 13 is provided with pairs of the projections 13*a* and 13*b* serving as first positioning portions for positioning to the sheet feeding apparatus 30 on both sides thereof. The projections 13*a* and 13*b* on one side in the U-direction illustrated in FIG. 5B are first projections in the present embodiment and the projections 13*a* and 13*b* on the other side in the U-direction illustrated in FIG. 5A are second projections in the present embodiment. The cover member 14 is also provided with cam portions 14*a* that abut with the shutter members 31 provided in the sheet feeding apparatus 30 described later and that serve as press portions for moving the shutter members 31 in attaching the separation unit 10. That is, the cover member 14 functions as a cover member for covering the roller holder 12 and as a member that moves the shutter members 31 along with the attachment operation of the separation unit 10.

As illustrated in FIGS. 6A and 7, the apparatus body 100 is provided with a pair of shutter members 31 serving as the restriction members. The shutter members 31 are provided respectively on the one side and the other side of the separation unit 10 in the U-direction in the present embodiment. The shutter member 31 on a right side in FIGS. 6A through 6C is a first restriction member in the present embodiment and the shutter member 31 on a left side in FIGS. 6A through 6C is a second restriction member in the present embodiment. Meanwhile, the separation unit 10 is provided with the projections 13*a* and 13*b* serving as abutted portions, i.e., positioning portions, that abut with the shutter members 31 as illustrated in FIGS. 5A and 5B. The projections 13*a* and 13*b* of the present embodiment are formed as parts of the base member 13 and project on one and other sides in the U-direction from both side surfaces in the U-direction of the separation unit 10.

As illustrated in FIG. 7, each shutter member 31 engages with rail portions 30*a* through 30*d* provided on the apparatus body 100 and is held slidably in the U-direction with respect to the apparatus body 100 in a state in which moves in the V- and W-directions, i.e., in a lateral and vertical directions in FIG. 7, are restricted. A direction in which each shutter member 31 slides is a direction intersecting with the V-direction, i.e., the attaching direction of the separation unit 10, and preferably is a direction along the U-direction.

The respective shutter members 31 are urged by shutter springs 32 in directions indicated by arrows in FIG. 6A. Each shutter spring 32 which is an elastic member disposed between a sheet feed frame 69 and one of the shutter members 31 functions as an urging portion.

Position of the shutter members 31 in FIG. 6A will be referred to as restrict positions, i.e., as first positions or lock positions. When the separation unit 10 is attached to a predetermined attaching position of the sheet feeding apparatus 30 and the shutter members 31 are located at the restrict positions, the projections 13*a* and 13*b* of the base member 13 engage with concave portions 30*f* and 30*g* serving as second positioning portions provided on the apparatus body 100 as illustrated in FIG. 7. Press portions 31*d* of the shutter members 31 also engage or abut with projections 13*a* and 13*b* of the base member 13 and restrict the separation unit 10 from moving in a Vd-direction, i.e., in a direction opposite to the V-direction or in the detaching direction. This state is an attached state of the separation unit 10 to the sheet feeding apparatus 30.

The projections 13*a* and 13*b* on one side in the U-direction project to one side in the U-direction from a side surface on one side in the U-direction of the separation unit 10 and are arrayed in the W-direction intersecting with the U-direction, i.e., in the rotation axial direction of the separation roller 11, and in the detaching direction Vd of the separation unit 10. In the same manner, the projections 13*a* and 13*b* on the other side in the U-direction also project to the other side in the U-direction from a side surface on the other side in the U-direction of the separation unit 10 and are arrayed in the W-direction. Accordingly, the separation unit 10 in the attached state is positioned by the two shutter members 31, i.e., the first restriction member and the second restriction member, that abut with the projections 13*a* and 13*b* on both sides in the U-direction. Specifically, the separation unit 10 is positioned steadily by the two shutter members 31 that abut with the four projections 13*a* and 13*b* in the present embodiment.

The shutter members 31 can be moved in the U-direction and an opposite direction thereto from the restrict positions as illustrated in FIG. 6B and the operator can move the shutter members 31 by holding the handling portions 31*c*, i.e., grip portions, in directions indicated by arrows in FIG. 6B. As the operator moves the shutter members 31 in the arrow directions in FIG. 6B, the shutter members 31 are disengaged from the projections 13*a* and 13*b* of the base member and the separation unit 10 can be moved in the Vd-direction. The positions of the shutter members 31 at this time will be referred to as a release position.

The present embodiment is configured such the separation roller 11 is separated from the sheet feed roller 26 and the separation nip is released when the cassette 35 is drawn out of the sheet feeding apparatus 30. This arrangement is made to prevent the sheet S from being left in the separation nip in drawing the cassette 35 out of the sheet feeding apparatus 30. That is, the separation roller 11 is configured to be contactable with and separable from the sheet feed roller 26 by a nip releasing mechanism.

Configuration for Coupling Roller Shaft

Figure 8:
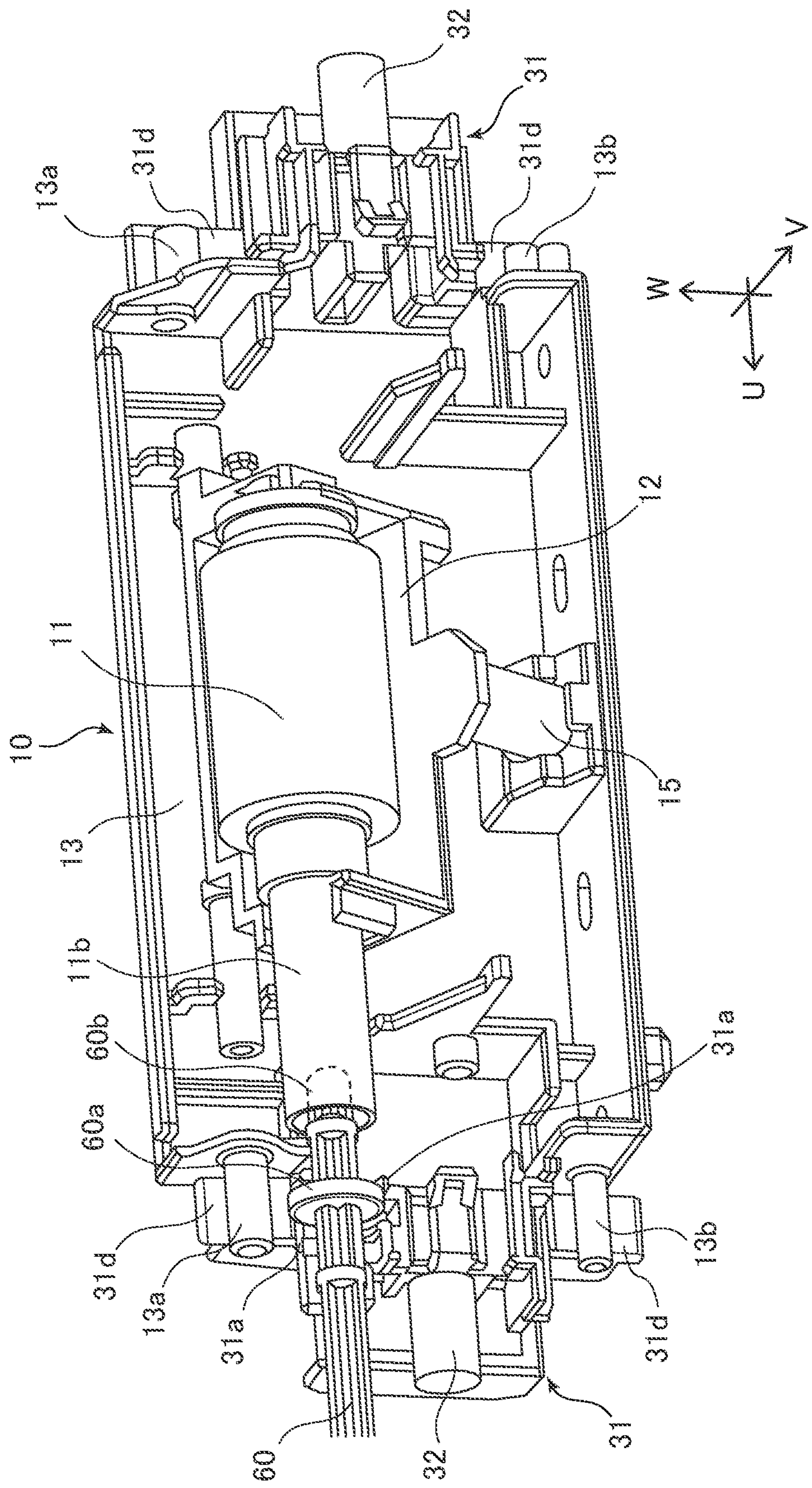
FIG. 8 is a perspective view illustrating an inside of the separation unit of the second embodiment.
Figure 9:
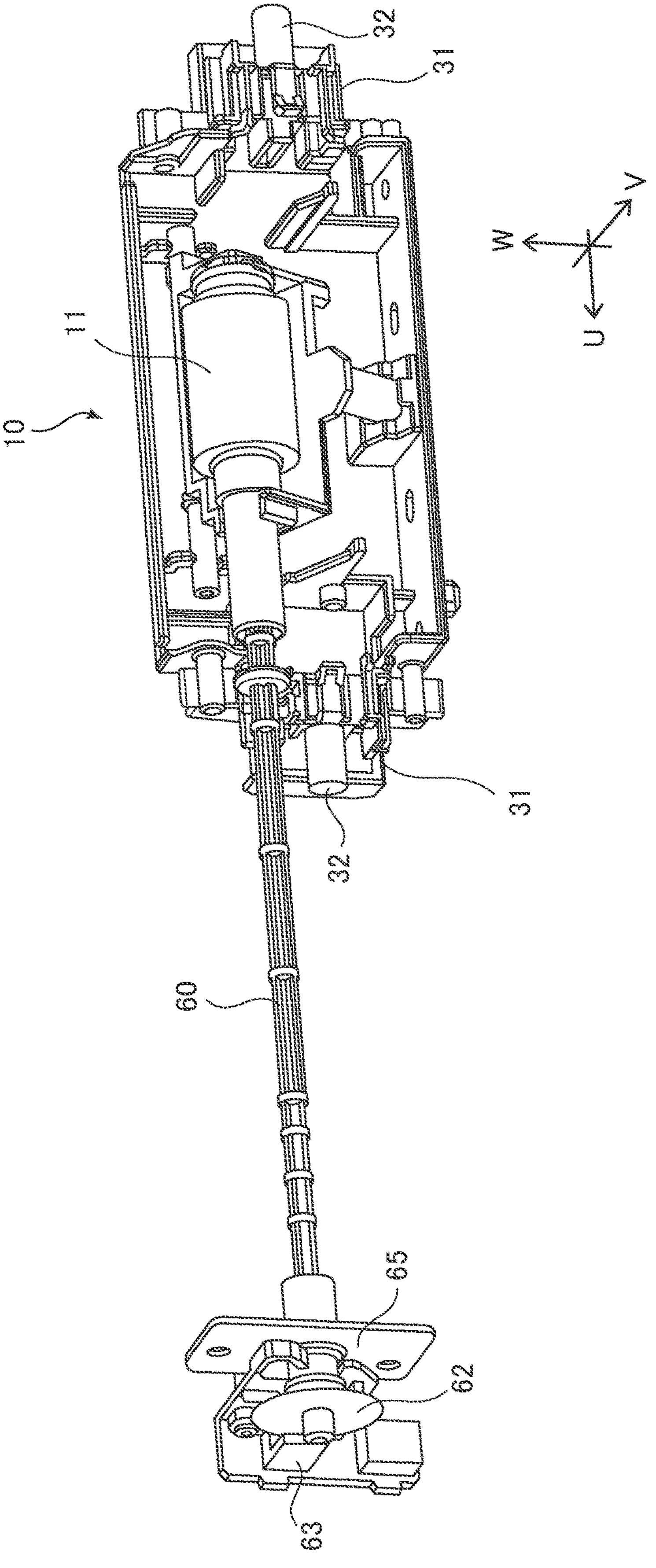
FIG. 9 is a perspective view illustrating a rotary encoder of the second embodiment.

The configuration of the separation unit 10 will be described further with reference to FIGS. 8 and 9. FIG. 8 is a perspective view of the separation unit 10 from which the cover member 14 and the nip guide 61 are detached. FIG. 9 is a perspective view illustrating a configuration for detecting rotation of the separation roller 11.

The roller shaft 60 serving as a first rotary member of the present embodiment is configured to be coupled with and decoupled from the separation roller 11 serving as a second rotary member of the present embodiment by sliding in the U-direction, i.e., in the rotation axial direction of the roller shaft 60. As illustrated in FIG. 8, the roller shaft 60 is provided with a key 60*b* which is a cross-shaped projection or rib at a tip thereof and the separation roller 11 is provided with a coupling portion 11*b* in which a keyway of a cross-shaped recess or depression to be fitted with the key 60*b* is formed. A position of the roller shaft 60 where the key 60*b* fits with the keyway will be referred to as a “coupling position” and a position of the roller shaft 60 where the key 60*b* separates from the keyway will be referred to as a “decoupling position” hereinafter.

The roller shaft 60 is also provided with an annular rib 60*a* serving as an engaged portion of the present embodiment. The annular rib 60*a* is a projection protruding radially from the roller shaft 60 and formed into a radially extending disk. One shutter member 31 (on the left side in FIG. 6) is provided with an engaging portion 31*a* engaging with the annular rib 60*a*. The engaging portion 31*a* has a U-shaped groove sandwiching the annular rib 60*a* from both sides in the U-direction. Accordingly, the roller shaft 60 is restricted from moving in the U-direction with respect to the shutter member 31 in a state in which the engaging portion 31*a* is engaged with the annular rib 60*a*. The roller shaft 60 is held at the coupling position when the shutter member 31 is located at the restrict position, i.e., at a first position, by the abovementioned engagement of the engaging portion 31*a* with the annular rib 60*a*. When the shutter member 31 is located at the release position, i.e., at a second position, the roller shaft 60 is held at the decoupling position.

The shutter members 31 are provided with pressed portions pressed by the cam portions 14*a* serving as press portions provided in the separation unit 10. The shutter members 31 are also provided with handling portions 31*c* (see FIG. 6B) to be operated manually by the operator. The handling portions 31*c* are provided at positions exposed when the abovementioned door 115 (see FIG. 1) of the apparatus body 100 is opened. An operation for attaching the separation unit 10 or a move of the slide member 53 to be operated by the operator will be described later.

As illustrated in FIG. 9, the roller shaft 60 is rotatably supported by the supporting plate 65 fixed to the apparatus body 100. A rotary disk 62 serving as an encoder member is also attached to an end portion of the roller shaft 60 on a side opposite from the key 60*b*. A slit pattern that transmits light is perforated through the rotary disk 62, and a photoelectric sensor 63 serving as a detecting portion can read an amount of rotation of the roller shaft 60. That is, the rotary disk 62 and the photoelectric sensor 63 constitute a rotary encoder for detecting the amount of rotation of the separation roller 11. Data of the amount of rotation read by the photoelectric sensor 63 is utilized for informing a duration life of the separation roller 11, for controlling the rotation of the sheet feed roller 26 and others.

Attaching Separation Unit

Figure 10A:
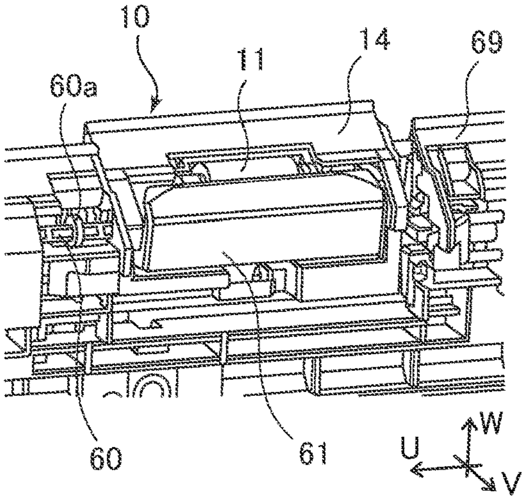
FIG. 10A is a perspective view illustrating the separation unit and a part of an apparatus body of the second embodiment.
Figure 10B:
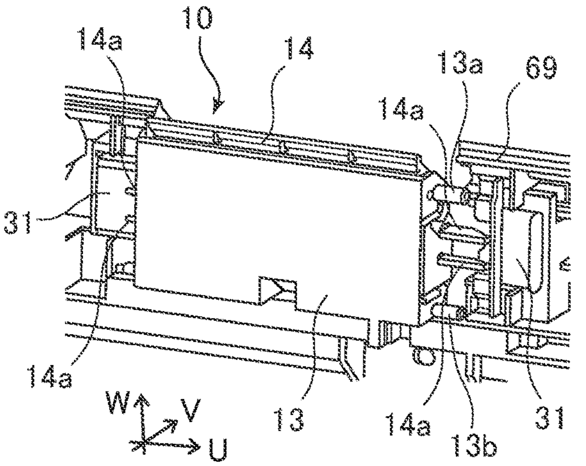
FIG. 10B is a perspective view illustrating the separation unit and the part of the apparatus body of the second embodiment.
Figure 10C:
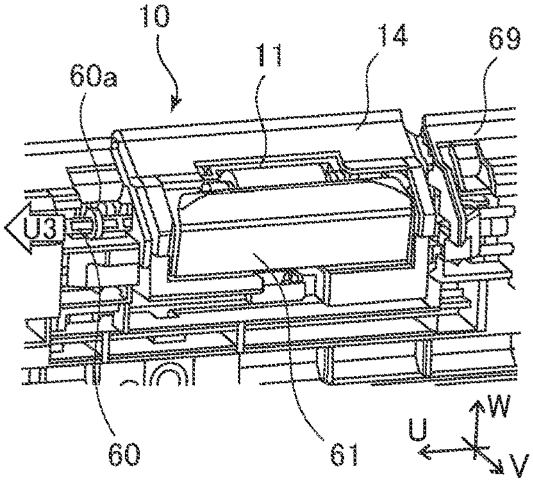
FIG. 10C is a perspective view illustrating the separation unit and the part of the apparatus body of the second embodiment.
Figure 10D:
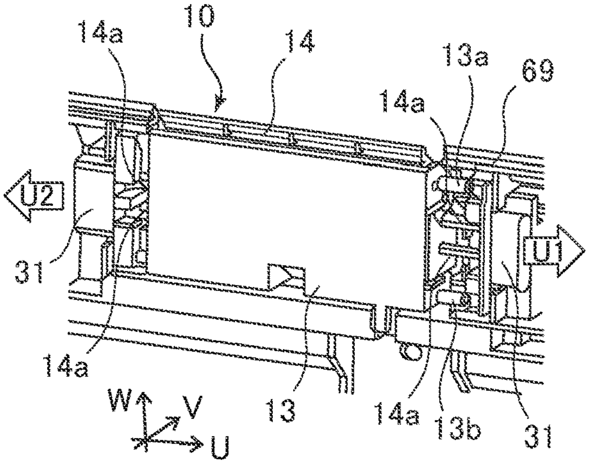
FIG. 10D is a perspective view illustrating the separation unit and the part of the apparatus body of the second embodiment.
Figure 10E:
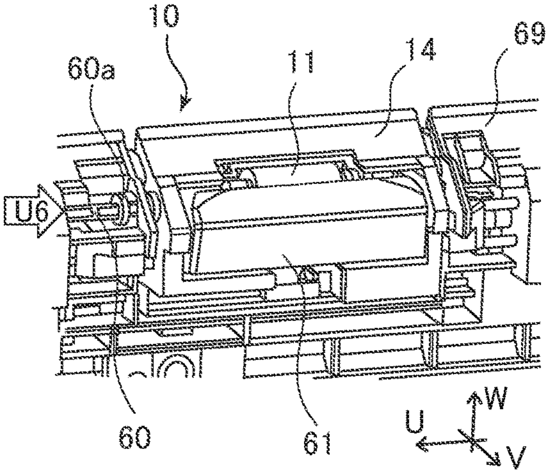
FIG. 10E is a perspective view illustrating the separation unit and the part of the apparatus body of the second embodiment.
Figure 10F:
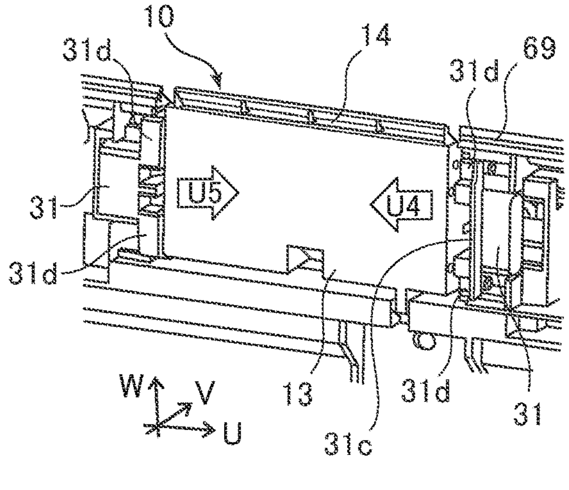
FIG. 10F is a perspective view illustrating the separation unit and the part of the apparatus body of the second embodiment.

Next, moves of the roller shaft 60 and the shutter members 31 in attaching the separation unit 10 will be described with reference to FIGS. 6A through 6C and FIGS. 10A through 10F. FIGS. 10A and 10B illustrate a state before the separation unit 10 is attached, 10C and 10D illustrate a state in which the separation unit 10 is on a way of being attached and FIGS. 10E and 10F illustrate a state in which the separation unit 10 is completely attached. Note that FIGS. 10A, 10C and 10E are perspective views illustrating the separation unit 10 and the sheet feed frame 69 which is a part of the apparatus body 100 seen from downstream in the V-direction, i.e., in the attaching direction, and FIGS. 10B, 10D and 10F are perspective views illustrating the separation unit 10 and the sheet feed frame 69 seen from upstream in the V-direction. As for the positional relationship between the separation unit 10 and the shutter members 31, FIGS. 10A and 10B are approximately identical with FIG. 6C, FIGS. 10C and 10D are approximately identical with FIG. 6B, and FIGS. 10E and 10F are approximately identical with FIG. 6A.

As illustrated in FIG. 6C and FIGS. 10A and 10B, each shutter member 31 is urged by the shutter spring 32 and is abutted against an abutment portion provided on the sheet feed frame 69 in a state before the separation unit 10 is attached to the apparatus body 100. In this case, each shutter member 31 is positioned at the restrict position, i.e., the first position. The roller shaft 60 is held at the coupling position by the shutter member 31.

In a case where the operator performs the operation for attaching the separation unit 10, the operator holds the separation unit 10 at the position and orientation illustrated in FIGS. 10A and 10B and inserts the separation unit 10 in the V-direction, i.e., in the attaching direction. At this time, the tip of the roller shaft 60 and the separation unit 10 are located in a positional relationship overlapping with each other in view from the V-direction. The cam portions 14*a* provided on the separation unit 10 are located at positions overlapping with the pressed portions of the shutter members 31 in view from the V-direction. Still further, the projections 13*a* and 13*b* provided on the separation unit 10 are located at positions overlapping with the press portions 31*d* of the shutter members 31 in view from the V-direction.

Along with the insertion of the separation unit 10, the cam portions 14*a* of the separation unit 10 abut with the pressed portions of the shutter members 31 as illustrated in FIG. 6B and FIGS. 10C and 10D. The cam portions 14*a* are inclined in the V-direction, i.e., in the attaching direction, so as to extend in one and other sides in the U-direction toward upstream in the V-direction. Therefore, the operator slides the separation unit 10 such that the cam portions 14*a* spread the pair of shutter members 31 in the one and the other directions in the U-direction in spite of the urging force of the shutter springs 32 along with the attaching operation of the separation unit 10. Thereby, the shutter members 31 move from the restrict positions, i.e., the first positions, to the release positions, i.e., the second position, as indicated by arrows U1 and U2. That is, the cam portions 14*a* each have a function of exerting a component of force along the U-direction heading from the restriction position to the release position on a corresponding shutter member 31 at the contact portion of the separation unit 10 and the corresponding shutter member 31 along with the move of the separation unit 10 in the V-direction. Then, the roller shaft 60 engaged with one shutter member 31 moves from the coupling position in FIG. 10A to the decoupling position in FIG. 10C as indicated by an arrow U3 along with the move of the shutter member 31 from the restrict position to the release position.

It is noted that shapes of the cam portions 14*a* and the shutter member 31 are set such that a predetermined clearance in the U-direction is assured between the tip of the roller shaft 60 and the separation roller 11 in FIGS. 10C and 10D. This clearance is set such that the tip of the roller shaft 60 located at the decoupling position does not come into contact with the separation roller 11 by considering a manufacturing tolerance and others. Therefore, in the state in which the roller shaft 60 is located at the decoupling position, the abovementioned overlap state between the tip of the roller shaft 60 and the separation roller 11 is eliminated. The overlap states between the cam portions 14*a* of the separation unit 10 and the pressed portions of the shutter members 31 and between the projections 13*a* and 13*b* of the separation unit 10 and the press portion 31*d* of the shutter members 31 are also eliminated in the state in FIGS. 10C and 10D. Therefore, the operator can insert the separation unit 10 into a predetermined attaching position without causing interference between the separation roller 11 and the roller shaft 60. The predetermined attaching position is a position where the rotation axial line of the separation roller 11 approximately coincides with the rotation axial line of the roller shaft 60.

Still further, while each cam portion 14*a* of the separation unit 10 functions as the inclined portion that generates the component of force for sliding the shutter member 31, the shutter members 31 may be provided with inclined portions like the taper surface 53*a* of the first embodiment.

When the separation unit 10 arrives at the attaching position, the force that has been generated at the contact portions of the cam portions 14*a* and the shutter members 31 do not act any longer on the shutter members 31 because the cam portions 14*a* have passed through the pressed portions of the shutter members 31 as illustrated in FIG. 6A and FIGS. 10E and 10F. Due to that, the shutter members 31 move from the release positions, i.e., the second positions, to the restrict positions, i.e., the first positions, as indicated by arrows U4 and U5 by the urging force of the shutter springs 32. The shutter members 31 then stop at the restrict positions by abutting against the abutment portions provided on the sheet feed frame 69. It is noted that spaces for accommodating the cam portions 14*a* are provided on a back side, i.e., a rear side in the V-direction, of the pressed portions of the shutter members 31.

Along with the move of the shutter members 31, the roller shaft 60 also moves from the decoupling position to the coupling position toward a direction opposite from the U-direction as indicated by an arrow U6. Thereby, because the key 60*b* of the roller shaft 60 fits with the keyway of the coupling portion 11*b* of the separation roller 11, the rotary disk 62 of the rotary encoder (see FIG. 9) comes to rotate together with the separation roller 11.

Still further, as the shutter members 31 take the restrict positions indicated in FIG. 6B and FIGS. 10E and 10F, the press portions 31*d* of the shutter members 31 also lock the projections 13*a* and 13*b* of the separation unit 10 to restrict the separation unit 10 from moving in the detaching direction, i.e., in the Vd-direction. That is, each shutter member 31 functions also as a member that restricts the move of the separation unit 10 and positions the separation unit 10 in terms of the V-direction.

Detaching Separation Unit

Meanwhile, in a case of detaching the separation unit 10 out of the apparatus body 100, the operator operates the handling portions 31*c* provided on the shutter members 31. Specifically, the operator pinches the handling portions 53*c* by fingers in a state of FIG. 6A and FIGS. 10E and 10F and slides the shutter members 31 on the one and the other sides in the U-direction against the urging force of the shutter spring 32. As the shutter members 31 on both sides move from the restrict positions to the release positions, the tip of the roller shaft 60 separates from the coupling portion 11*b* of the separation roller 11 with a predetermined clearance. In the same time, the shutter members 31 retract to positions not overlapping with the cam portions 14*a* and the projections 13*a* and 13*b* of the separation unit 10 in view from the V-direction (see FIG. 10B and FIGS. 10C and 10D).

In other words, as the coupling of the roller shaft 60 with the separation roller 11 is released, the overlap state of the shutter members 31 with the cam portions 14*a* and the projections 13*a* and 13*b* of the separation unit 10 in the attached state is eliminated. In this state, the move of the separation unit 10 in the detaching direction, i.e., in the Vd-direction, is not hampered. Accordingly, the operator can draw the separation unit 10 out of the apparatus body 100 by pulling out the separation unit 10 in the Vd-direction in a state in which the shutter members 31 are moved to the release positions by handling the handling portions 31*c*. Then, the roller replacement work is completed by detaching the separation roller 11 from the roller holder 12, by attaching a new separation roller 11 and by attaching a new separation unit 10 again to the apparatus body 100.

As described above, the coupling of the roller shaft 60 with the separation roller 11 and the partial overlap state of the shutter members 31 with the separation unit 10 are kept unless the handling portions 31*c* are operated in a direction resisting against the urging force of the shutter spring 32. Therefore, the separation unit 10 is restricted from being detached in the state in which the roller shaft 60 provided in the apparatus body 100 is coupled with the separation roller 11 provided in the separation unit 10. That is, the present embodiment makes it possible to prevent the roller shaft 60 or the separation roller 11 from been damaged otherwise caused by forcible detachment of the separation unit 10 without complicating the attaching and detaching works of the separation unit 10.

MODIFIED EXAMPLES

It is noted that while the separation unit 10 having the separation roller 11 has been described as an example of the unit to be attached to and detached from the apparatus body 100 of the sheet feeding apparatus 30 in the present embodiment, the technology of the present disclosure is also applicable to a configuration for attaching and detaching the roller unit 21 having the sheet feed roller 26. In this case, the roller unit 21 is configured to be coupled with and decoupled from the sheet feeding roller 26 by sliding the roller shaft of the sheet feed roller 26 in the rotation axial direction. Then, a restriction member that is movable to a restrict position where the roller unit 21 located at an attaching position is restricted from being detached and to a release position where the roller unit 21 is allowed to be detached may be provided such that the roller shaft of the sheet feed roller 26 slides in linkage with the restriction member.

While the form of the key and the keyway has been used as the configuration for coupling the roller shaft 60 with the separation roller 11 to minimize a transmission error, the present disclosure is not limited to such configuration and a parallel pin, magnet or the like may be used.

Still further, while the shutter members 31 serving as the restriction members are provided on both sides of the separation unit 10 in the U-direction in the present embodiment, only the shutter member 31 that engages with the annular rib 60*a* of the roller shaft 60 may be disposed for example.

Third Embodiment

A case where the present technology is applied to a separation unit provided with a retard driving roller member will be described as a third embodiment. Components of the present embodiment denoted by the common reference signs with those of the second embodiment have substantially same configuration and operations with the second embodiment, and parts different from the second embodiment will be mainly described.

Figure 11:
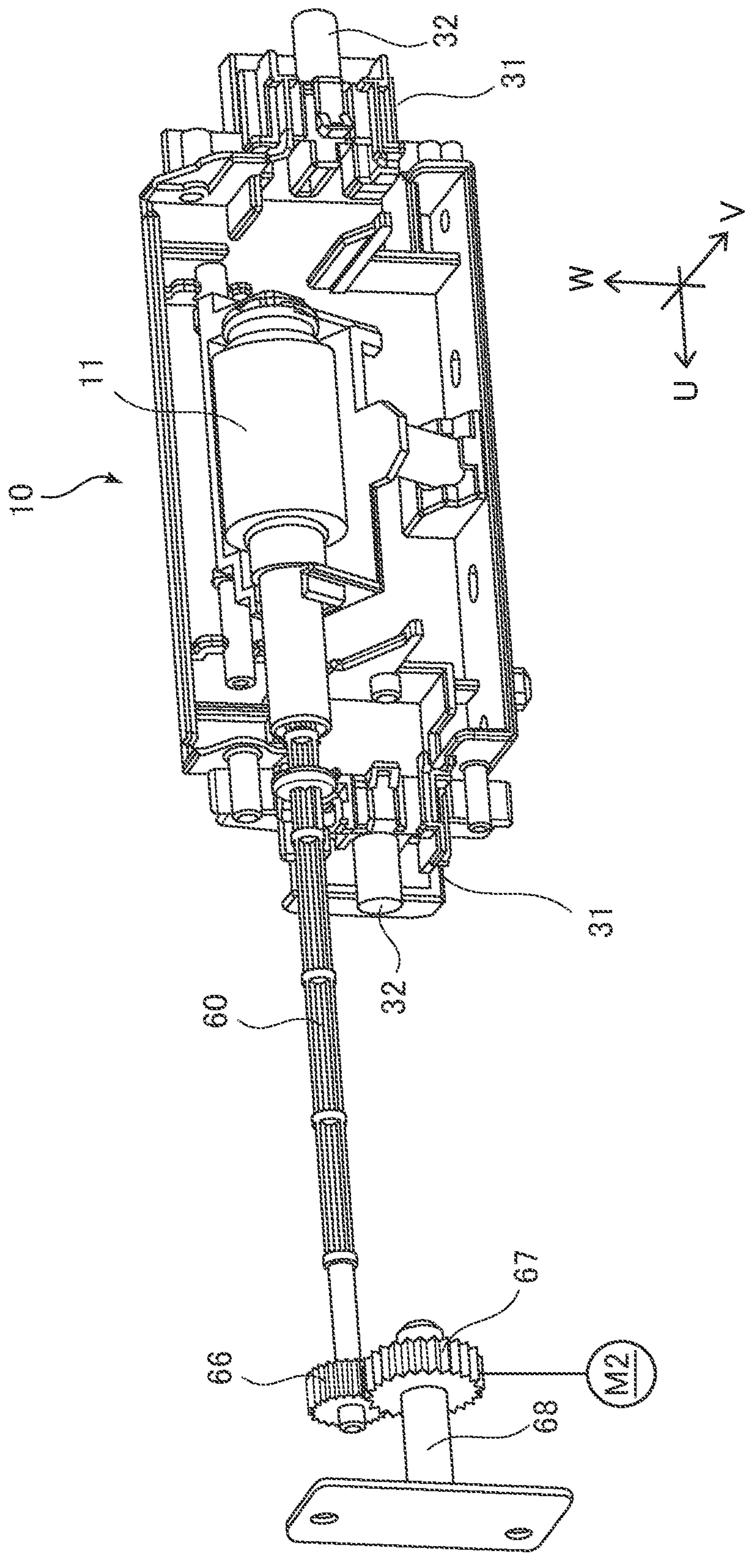
FIG. 11 is a perspective view illustrating a configuration for driving a separation roller of a third embodiment.

FIG. 11 is a perspective view illustrating a separation unit 10, a roller shaft 60 and others of the present embodiment. The roller shaft 60 is attached with a gear 66 that rotates in a body with the roller shaft 60. The gear 66 is meshed with a gear 67 coupled with a motor M2 serving as a driving source. The gear 67 is rotatably supported by a gear shaft 68 attached to a sheet metal frame of the apparatus body 100. Accordingly, a driving force supplied from the motor M2 is transmitted through the gears 66 and 67 and is also transmitted to the separation roller 11 through a coupling of a key 60*b* of the roller shaft 60 with a keyway of the separation roller 11.

A torque limiter is installed in the separation roller 11. Therefore, the separation roller 11 is driven with a torque value of the torque limiter in a direction opposite to the rotation of the sheet feed roller 26, i.e., in a retard direction or counterclockwise in FIG. 4. The torque value of the torque limiter is set so as to permit the separation roller 11 to rotate following the sheet feed roller 26 when only one sheet S is passing through the separation nip. The torque value of the torque limiter is also set such that the separation roller 11 rotates in the retard direction and pushes back a sheet to the cassette 35 by overcoming a friction between the sheets S when two or more sheets S enter the separation nip. Accordingly, the separation roller 11 of the present embodiment also functions as a separation member separating a sheet other than the sheet in contact with the sheet feed roller 26 by exerting a frictional force at the separation nip.

Here, the roller shaft 60 moves to the coupling position and the decoupling position in linkage with the shutter members 31 serving as the restriction members. Therefore, even in a case where the roller shaft 60 plays a role of transmitting the driving force to the separation roller 11, it is possible to prevent the roller shaft 60 or the separation roller 11 from being damaged otherwise caused by forcible detachment of the separation unit 10 without complicating the work for attaching and detaching the separation unit 10.

OTHER EMBODIMENTS

While the printer 1 described in the first through third embodiments are an electrophotographic image forming apparatus, the technology of the present disclosure is also applicable to an image forming apparatus adopting another image forming system such as an inkjet system. The image forming apparatus described here also refers to an apparatus in general configured to form an image onto a recording medium and includes, not only a printer configured to print based on image information inputted from outside, but also a copier, a multi-function printer and the like. The sheet feeding apparatus is not also limited to what is a part of the image forming apparatus and includes an apparatus used in linkage with the image forming apparatus, i.e., a so-called option feeder and an automatic document feeder feeding a document sheet to an image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-131919, filed on Aug. 3, 2020, which is hereby incorporated by reference herein in its entirety.

What is claimed is:

1. An image forming apparatus comprising:

an apparatus body comprising an image forming unit configured to form an image on a sheet;

a unit detachably attached to the apparatus body;

a roller member provided in the unit and configured to come into contact with a sheet;

a roller shaft supporting the roller member provided in the apparatus body and configured to be coupled with and decoupled from the roller member by being moved in a rotation axial direction of the roller member;

a sheet stacking portion on which sheets are stacked; and a sheet feed roller configured to feed a sheet stacked on the sheet stacking portion, and a restriction member provided in the apparatus body and movable to a first position and a second position, the first position being a position where the restriction member restricts the unit attached to the apparatus body from being detached in a detaching direction intersecting with the rotation axial direction, the second position being a position where the restriction member does not restrict the unit attached to the apparatus body from being detached in the detaching direction, wherein the restriction member comprises an engaging portion configured to engage with the roller shaft and is configured to move the roller shaft by the engaging portion so that the roller shaft is decoupled from the roller member along with a move of the restriction member from the first position to the second position, and wherein the roller member is arranged to be in contact with the sheet feed roller to form a nip portion between the sheet feed roller and the roller member and is configured to separate the sheet in contact with the sheet feed roller from sheets other than the sheet in contact with the sheet feed roller by exerting a frictional force on the sheets at the nip portion.

2. The image forming apparatus according to claim 1, further comprising:

an urging portion provided in the apparatus body and configured to urge the restriction member toward the first position; and a press portion provided in the unit and configured to press the restriction member to move from the first position to the second position in spite of an urging force of the urging portion along with an operation of moving the unit in an attaching direction opposite from the detaching direction, wherein in a case where the unit is moved in the attaching direction to a predetermined attaching position, the restriction member is moved from the second position to the first position by the urging force of the urging portion, and the roller shaft is coupled with the roller member along with a move of the restriction member from the second position to the first position.

3. The image forming apparatus according to claim 2, wherein the restriction member comprises an inclined portion inclined with respect to the attaching direction such that a component of force in a direction along the rotation axial direction and heading from the first position to the second position acts on the restriction member in a state in which the restriction member is pressed by the press portion in the attaching direction.

4. The image forming apparatus according to claim 2, wherein the press portion comprises an inclined portion inclined with respect to the attaching direction such that a component of force in a direction along the rotation axial direction and heading from the first position to the second position acts on the restriction member in a state in which the restriction member is pressed by the press portion in the attaching direction.

5. The image forming apparatus according to claim 2, wherein the urging portion is an elastic member disposed between the apparatus body and the restriction member.

6. The image forming apparatus according to claim 1, wherein the restriction member comprises a handling portion by which the restriction member is moved manually from the first position to the second position.

7. The image forming apparatus according to claim 1, further comprising a detecting portion provided in the apparatus body and configured to detect rotation of the roller shaft.

8. The image forming apparatus according to claim 1, further comprising a driving source provided in the apparatus body and configured to drive the roller shaft to rotate, wherein the roller member is rotated by a driving force of the driving source transmitted through the roller shaft in a state in which the roller member is coupled with the roller shaft.

9. The image forming apparatus according to claim 1, wherein the restriction member is a first restriction member and is disposed on one side of the unit in the rotation axial direction, wherein the image forming apparatus further comprises a second restriction member provided in the apparatus body and disposed on another side of the unit in the rotation axial direction, a first projection projecting from a side surface on the one side of the unit in the rotation axial direction of the unit, and a second projection projecting from a side surface on the another side of the unit in the rotation axial direction, and wherein the unit is positioned with respect to the apparatus body by the first projection abutting with the first restriction member and the second projection abutting with the second restriction member in a state in which the unit is attached in the apparatus body.

10. A sheet feeding apparatus comprising:

a sheet feed roller configured to feed a sheet;

an apparatus body configured to support the sheet feed roller;

a unit detachably attached to the apparatus body;

a separation roller provided in the unit, arranged to be in contact with the sheet feed roller to form a nip portion between the sheet feed roller and the separation roller, and configured to separate the sheet in contact with sheet feed roller from sheets other than the sheet in contact with the sheet feed roller by exerting a frictional force on the sheets at the nip portion;

a roller shaft provided in the apparatus body and configured to be coupled with and decoupled from the separation roller by being moved in a rotation axial direction of the separation roller; and a restriction member provided in the apparatus body and movable to a first position and a second position, the first position being a position where the restriction member restricts the unit attached to the apparatus body from being detached in a detaching direction intersecting with the rotation axial direction, the second position being a position where the restriction member does not restrict the unit attached to the apparatus body from being detached in the detaching direction, wherein the restriction member comprises an engaging portion configured to engage with the roller shaft and is configured to move the roller shaft by the engaging portion so that the roller shaft is decoupled from the separation roller along with a move of the restriction member from the first position to the second position.

11. The sheet feeding apparatus according to claim 10, further comprising:

an urging portion provided in the apparatus body and configured to urge the restriction member toward the first position; and a press portion provided in the unit and configured to press the restriction member to move from the first position to the second position in spite of an urging force of the urging portion along with an operation of moving the unit in an attaching direction opposite from the detaching direction, wherein in a case where the unit is moved in the attaching direction to a predetermined attaching position, the restriction member is moved from the second position to the first position by the urging force of the urging portion, and the separation roller is coupled with the roller shaft along with a move of the restriction member from the second position to the first position.

12. The sheet feeding apparatus according to claim 11, wherein the restriction member comprises an inclined portion inclined with respect to the attaching direction such that a component of force in a direction along the rotation axial direction and heading from the first position to the second position acts on the restriction member in a state in which the restriction member is pressed by the press portion in the attaching direction.

13. The sheet feeding apparatus according to claim 11, wherein the press portion comprises an inclined portion inclined with respect to the attaching direction such that a component of force in a direction along the rotation axial direction and heading from the first position to the second position acts on the restriction member in a state in which the restriction member is pressed by the press portion in the attaching direction.

14. The sheet feeding apparatus according to claim 11, wherein the urging portion is an elastic member disposed between the apparatus body and the restriction member.

15. The sheet feeding apparatus according to claim 10, wherein the restriction member comprises a handling portion by which the restriction member is moved manually from the first position to the second position.

16. The sheet feeding apparatus according to claim 10, further comprising a detecting portion configured to detect rotation of the separation roller.

17. The sheet feeding apparatus according to claim 10, further comprising a driving source provided in the apparatus body to and configured to drive the roller shaft to rotate, wherein the separation roller is rotated by a driving force of the driving source transmitted through the roller shaft in a state in which the roller shaft is coupled with the separation roller.

* * * * *